Dec. 10, 1963   W. ZELL ETAL   3,113,358
SUPPORTING CLIPS
Filed Jan. 31, 1963

INVENTORS
William Zell and
Martin Zell 3,113,358
SUPPORTING CLIPS
William Zell and Martin Zell, McKeesport, Pa., assignors to Zell Brothers, Incorporated, East McKeesport, Pa.
Filed Jan. 31, 1963, Ser. No. 255,288
2 Claims. (Cl. 20—92.4)

This invention relates to supporting clips and particularly to supporting clips for use in assembly and disassembly of panel walls and shelves for show cases and cabinets. Clips of various types have been heretofore proposed. For example, Rieder Patent No. 2,879,561, issued March 31, 1959, illustrates and describes a clip having a latch member mounted to a wooden panel and a keeper member mounted to another wooden panel. The latch member has two arm members and a spring hook member, all perpendicular to the latch member. The spring hook member is located between the two arm members. In assembling the two panel walls together at right angles, the arm members engage the keeper member until the spring hook member locks with the keeper member. The spring hook must be depressed to free the arm members from the keeper member when disassembling the panel walls of a case or cabinet.

There are several deficiencies in this type of clip. The locking mechanism is loose fitting. In order to disassemble a panel wall having several clips, the springs must be depressed simultaneously. The arm members do not provide a strong lateral stability between panel walls. The manufacture of such clips is difficult because of the many members that are used to comprise the clip.

The new supporting clip solves all of these problems by:

(a) Using a tight fitting locking means whereby a panel having numerous clips can be separated from an adjoining panel by applying a sudden shock or jerking force to one panel wall.

(b) Using a clip design which gives the greatest lateral stability between panel walls.

(c) Using a clip design which uses the minimum number of parts.

We provide an attachable clip for supporting and securing two planar structures adjacently disposed to each other, said clip comprising two members formed from rigid material, one of said members being fastened to one planar structure to be joined adjacent to its edge and forming with said planar structure a pair of spaced generally side-by-side pockets open adjacent the edge of said one planar structure, one of said pockets being provided with a concave surface zone, and the other of said members being fastened to the other planar member and carrying outwardly extending leg members adapted to enter the pockets formed by said one member and a convex surface zone on one of said leg members engaging the concave surface zone of the said one member.

When the two members are fully engaged, the convex surface zone and the concave surface zone are slightly off-set. This produces a pulling action between said members by having the concave and convex surface zones seeking to fully seat each other. Both the concave and convex surface zones are hyperboloid in shape forming dimples to facilitate the pulling action when locking is desired and to facilitate disengaging the members when applying a jerking force against a planar structure.

The clip comprises two members, a latch member and a receiving member. The latch member comprises two legs integral and angular to a base portion. One leg has a convex surface zone. When the receiving member is mounted to a planar structure, two pockets are formed. One side of each pocket is formed by the planar structure, and the other three sides of each pocket are formed by the receiving member. One pocket has a concave surface zone formed on the inside wall on the receiving member portion. When the legs of the latch member engage the pockets of the receiving member, the two members are forced together until the convex surface zone of one leg engages the concave surface zone on the inside pocket wall, thereby securing the two members tightly together. The two legs engaging two separate pockets provide lateral stability between the adjoined planar structures.

To permanently secure the two clip members, there is provided a hole in one leg and a hole through one pocket wall of the receiving member. When the legs and the pockets are engaged, the two holes are aligned providing an opening permanently to secure the engaged members by a suitable means through the aligned holes.

Other details, objects and advantages of the invention will become apparent as the following description of a present preferred embodiment thereof proceeds.

In the accompanying drawings we have shown a present preferred embodiment of the invention and have illustrated a present preferred method of practicing the same in which FIGURE 1 is an isometric view of the two members of the supporting clip;

Figure 1:
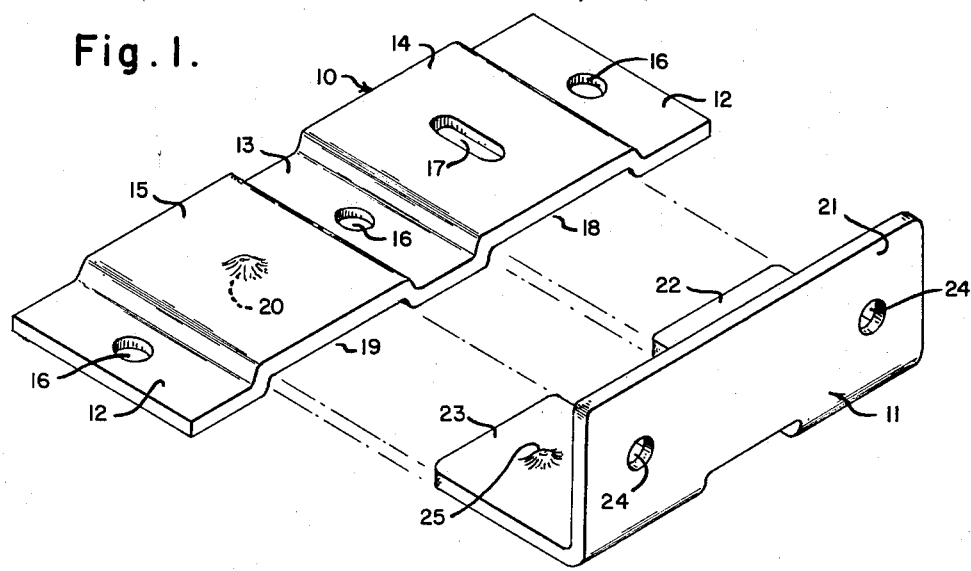
Figure 2:
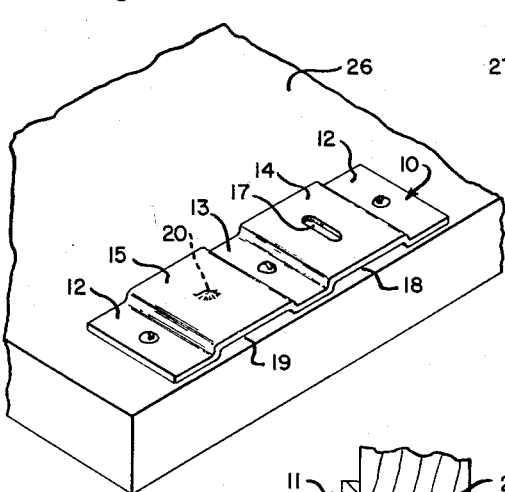
FIGURE 2 is an isometric view of the receiving member of the clip mounted to a panel wall sought to be assembled.
Figure 3:
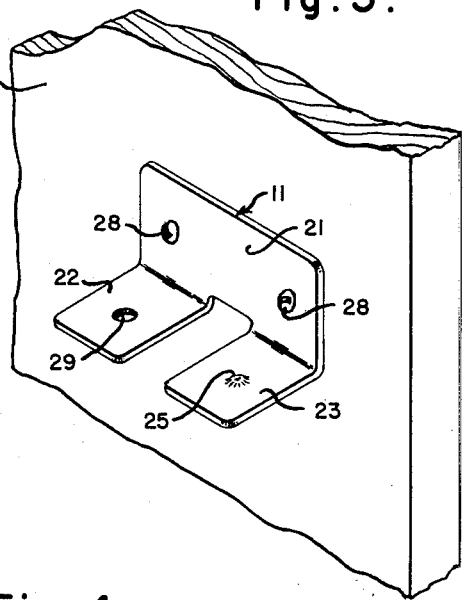
FIGURE 3 is an isometric view of the latch member of the clip mounted to a panel wall sought to be assembled.

Referring to the drawings, we have illustrated an attachable supporting clip comprising a receiving plate member 10 and a latch member 11. The receiving plate member 10 has outer flange portions 12 and an intermediate flange portion 13 which are mounted to a panel 26 using suitable fastening means through holes 16. When the receiving plate member 10 is mounted, two pockets 18 and 19 are formed. The pocket 18 is formed with off-set area 14 of the receiving plate member 10 and the face of panel 26. The pocket 19 is formed with off-set area 15 of the receiving plate member 10 and the face of panel 26. Off-set area 14 has an elongated hole 17. Off-set area 15 has a concave surface zone 20.

Latch member 11 comprises legs 22 and 23 perpendicular and integral to base 21. Leg 22 has a hole 29 to receive a suitable fastening means. Leg 23 has a convex surface zone 25. Base 21 has holes 24 to receive a suitable fastening means to mount latch member 11 to panel 27.

The clip operates in the following fashion. One corner of a cabinet can be assembled by adjoining panels 26 and 27 at right angles. To facilitate assembly of the corner, receiving plate member 10 is oriented and mounted on panel 26 by suitable fastening means through holes 16. The latch member 11 is oriented and mounted on panel 27 by suitable fastening means 28 through holes 24. Legs 22 and 23 enter pocket spaces 18 and 19 respectively. Leg 23 is forced to engage the convex and concave surface zones 25 and 20 respectively thereby tightly locking members 10 and 11 by frictional forces. Holes 17 and 29 are aligned to receive suitable fastening means to permanently secure members 10 and 11.

Figure 4:
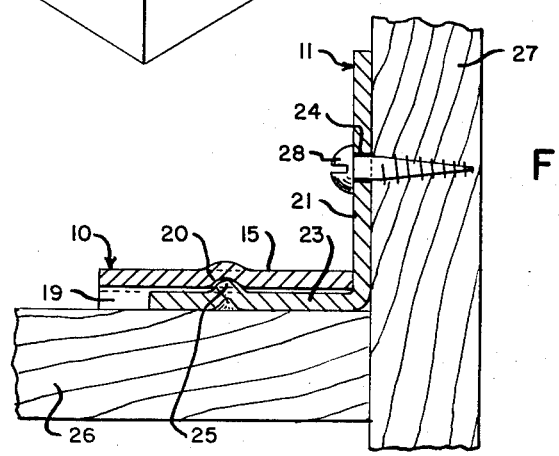
FIGURE 4 is a longitudinal cross-sectional view of the two mounted clip members engaged and locked together.

FIGURE 4 is a cross-sectional view showing leg 23 fully engaged in pocket space 19. The convex surface zone 25 hyperboloid in shape is off-set with the axis of the concave surface zone 20 which is hyperboloid in shape. This causes a pulling action between members 10 and 11 thereby giving a tight locking action.

To disassemble the adjoined panels 26 and 27, a sudden shock or jerking force can be applied against either panel.

The hyperboloid surfaces of the concave and convex surface zones 20 and 25 respectively facilitate the separation of leg 23 from pocket space 19.

While we have shown and described a present preferred embodiment of the invention, it is to be distinctly understood that the invention is not limited thereto, but may be otherwise variously embodied within the scope of the following claims.

We claim:

1. In a joint structure including a first structural member having a planar edge; a second structural member having a planar surface against which said planar edge abuts, the improvement comprising clip means for retaining said structural members in tightly assembled relationship; said clip means comprising a first clip member having a base mounted on the planar surface of said second structural member; said member including further, at least one outwardly projecting leg, said leg having thereon a biasing surface comprising a convex dimple projecting upwardly therefrom and spaced outwardly from said base member; a second clip member mounted on said first structural member and having an edge parallel to and spaced from the planar edge of said structural member a distance substantially equal to the thickness of the base of said first clip member; said second clip member including a resiliently deformable area spaced from the surface of said first structural member a distance substantially equal to the thickness of said projecting leg of said first clip member and forming therewith a pocket into which the leg of said first clip member is releasably inserted; a biasing surface comprising a concave dimple opening downwardly disposed in the area of the clip member which defines said pocket and engaged with the biasing surface on said leg; the longitudinal position of the biasing surface provided on said leg, relative to said base, being less than the longitudinal position of the biasing surface on said pocket, relative to the planar edge of said first structural member whereby the planar surface of said second structural member is continuously biased against the planar edge of said first structural member.

2. A clip assembly for joining a structural member in edge abutting relationship with respect to a planar surfaced, second structural member comprising a first clip member including an attaching base and a leg projecting at an angle to said attaching base; a biasing surface comprising a convex projection facing upwardly on said leg and longitudinally spaced from said base, a second clip member releasably engageable with said first clip member and comprising a generally rectangular plate having end attaching flanges and an off-set area extending transversely of the longer edge of said plate, the bottom surface thereof being spaced above the bottom surface of said flanges a distance substantially equal to the thickness of said leg of said first clip member, a downwardly opening biasing surface comprised of a concave recess formed in said off-set area and spaced from a longer edge of said plate a distance greater than the longitudinal distance from the biasing surface on said leg to its attaching base, whereby said biasing surfaces are in incompletely seated relationship when said leg of said first clip member is positioned within said off-set area of said second clip member.

References Cited in the file of this patent

UNITED STATES PATENTS

| 716,713 | Hughes | Dec. 23, 1902 |
| 1,062,456 | Greenleaf | May 20, 1913 |
| 1,887,159 | Knight | Nov. 8, 1932 |
| 2,056,366 | Richards | Oct. 6, 1936 |
| 2,530,031 | Rudolph | Nov. 14, 1950 |
| 3,068,030 | Ransom | Dec. 11, 1962 |

FOREIGN PATENTS

| 857,075 | Great Britain | Dec. 29, 1960 |